(12) United States Patent
Liu et al.

(10) Patent No.: US 11,389,906 B2
(45) Date of Patent: Jul. 19, 2022

(54) LASER CUTTING DEVICE, CONTROL METHOD AND CONTROL APPARATUS

(71) Applicants: HEFEI XINSHENG OPTOELECTRONICS TECHNOLOGY CO., LTD., Anhui (CN); BOE TECHNOLOGY GROUP CO., LTD, Beijing (CN)

(72) Inventors: Ping Liu, Beijing (CN); Qingyu Hu, Beijing (CN); Yong Sub Kim, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

(*) Notice: Subject to any disclaimer, the term of this patent is extended or adjusted under 35 U.S.C. 154(b) by 777 days.

(21) Appl. No.: 16/316,636

(22) PCT Filed: May 11, 2018

(86) PCT No.: PCT/CN2018/086603
§ 371 (c)(1),
(2) Date: Jan. 10, 2019

(87) PCT Pub. No.: WO2018/228104
PCT Pub. Date: Dec. 20, 2018

(65) Prior Publication Data
US 2020/0009689 A1    Jan. 9, 2020

(30) Foreign Application Priority Data

Jun. 15, 2017   (CN) .......................... 201710451027.6

(51) Int. Cl.
*B23K 26/38* (2014.01)
*B23K 26/03* (2006.01)
(Continued)

(52) U.S. Cl.
CPC .............. *B23K 26/38* (2013.01); *B23K 26/03* (2013.01); *B23K 26/0344* (2015.10);
(Continued)

(58) Field of Classification Search
CPC .... B23K 26/38; B23K 26/03; B23K 26/0344; B23K 26/0846; B23K 26/0869; B23K 26/402; B23K 2101/40
See application file for complete search history.

(56) References Cited

U.S. PATENT DOCUMENTS

| 2002/0060210 A1 | 5/2002 | Terada et al. |
| 2011/0282492 A1 | 11/2011 | Krause et al. |
| 2016/0039049 A1* | 2/2016 | Yang .................. B23K 37/0408 219/121.72 |

FOREIGN PATENT DOCUMENTS

| CN | 1603072 A | 4/2005 |
| CN | 102699483 A | 10/2012 |

(Continued)

OTHER PUBLICATIONS

Dynapar Incremental Encoder Overview. https://www.dynapar.com/technology/encoder_basics/incremental_encoder/ (Year: 2012).*

(Continued)

*Primary Examiner* — Timothy Kennedy
*Assistant Examiner* — Farah Taufiq
(74) *Attorney, Agent, or Firm* — ArentFox Schiff LLP; Michael Fainberg

(57) ABSTRACT

A laser cutting device comprises: a conveying mechanism (1) comprising a feeding end and a discharging end; a working platform (2) disposed at the discharging end of the conveying mechanism (1); a first counter (3) and a second counter (4) oppositely disposed at a side of the working platform (2) near the discharging end of the conveying mechanism (1) and driven respectively by two opposite side (Continued)

edges of a substrate (6) to rotate for counting; a laser cutter (5) disposed above the working platform (2); a control device (13) for determining a modified cutting motion path of the laser cutter according to a set cutting path, and starting and ending times of counting values of the first counter (3) and second counter (4), and for controlling the laser cutter to cut the substrate (6) according to the modified cutting motion path.

9 Claims, 3 Drawing Sheets

(51) Int. Cl.
    *B23K 26/402*      (2014.01)
    *B23K 101/40*      (2006.01)
    *B23K 26/08*      (2014.01)

(52) U.S. Cl.
    CPC ...... *B23K 26/0846* (2013.01); *B23K 26/0869* (2013.01); *B23K 26/402* (2013.01); *B23K 2101/40* (2018.08)

(56) References Cited

FOREIGN PATENT DOCUMENTS

| | | |
|---|---|---|
| CN | 102837130 A | 12/2012 |
| CN | 203095870 U | 7/2013 |
| CN | 203484589 U | 3/2014 |
| CN | 103846505 A | 6/2014 |
| CN | 104773573 A | 7/2015 |
| CN | 204504524 U | 7/2015 |
| CN | 205820489 U | 12/2016 |
| CN | 106808090 A | 6/2017 |
| CN | 106964907 A | 7/2017 |
| CN | 206445364 U * | 8/2017 |
| CN | 107138861 A | 9/2017 |
| EP | 2346690 B1 | 9/2012 |
| JP | H0786131 A | 3/1995 |
| JP | H10197211 A | 7/1998 |
| JP | 2790782 B2 * | 8/1998 |
| JP | 2015212012 A | 11/2015 |
| KR | 20040058160 A | 7/2004 |

OTHER PUBLICATIONS

PCT, "International Search Report," issued in connection with Application No. PCT/CN2018/086603, dated Jul. 20, 2018, 6 pages.
SIPO, "First Office Action," issued in connection with Application No. 201710451027.6, dated Jun. 4, 2018, 12 pages.

* cited by examiner

LASER CUTTING DEVICE, CONTROL METHOD AND CONTROL APPARATUS

This application is a National Stage of International Application No. PCT/CN2018/086603, filed May 11, 2018, which claims priority to Chinese Patent Application No. 201710451027.6, filed Jun. 15, 2017, both of which are hereby incorporated by reference in their entireties.

FIELD

This disclosure relates to the field of display device fabrication technologies, and particularly to a laser cutting device, and a control method and a control apparatus thereof.

BACKGROUND

In a production process of a display panel, a whole surface of a display layer pattern and cutting marks are required to be fabricated on a whole substrate. After the fabrication is completed, a laser cutting device is used to cut the whole substrate along the cutting marks, so as to obtain a plurality of display panels.

The laser cutting device mainly includes a work table, a conveying component, a control apparatus, and an image acquisition component and a laser cutter which are arranged above the work table. Where the conveying component includes a plurality of conveying belts arranged in parallel and configured to convey the whole substrate, and further includes a feed end and a discharge end. The work table is arranged at the discharge end of the conveying component. The image acquisition component is configured to acquire the cutting marks on the whole substrate. The laser cutter is configured to cut the whole substrate on the work table. The control apparatus is connected with the conveying component, the image acquisition component and the laser cutter and is configured to control working states of the conveying component, the image acquisition component and the laser cutter.

An existing display panel generally includes an ITO (Indium Tin Oxide) pattern layer, During the fabrication of the display panel, if the cutting marks are fabricated on the whole substrate with the ITO pattern layer, the ITO pattern layer is very easy to be damaged, so that the cutting marks are generally not fabricated on the whole substrate, but the laser cutting device is configured to blindly cut the whole substrate in the prior art. The blind cutting mainly includes following operations: determining an operation region and a coordinate of a set cutting line on the work table according to a size of the whole substrate and a position of the set cutting line; controlling the laser cutter to move to a coordinate position corresponding to the set cutting line; controlling the conveying component to convey the whole substrate to the operation region of the work table; and controlling the laser cutter to cut the whole substrate along the set cutting line.

The prior art has the defects that as the conveying belts of the conveying component generate different friction forces on the whole substrate, two side edges, parallel to an extension direction of the conveying belts, of the whole substrate have different displacements, leading to deviation of an actual cutting line of the whole substrate from the set cutting line and thus resulting in poor cutting accuracy and affecting the product quality of the display panel.

SUMMARY

The disclosure provides a laser cutting device, and a control method and a control apparatus thereof, so as to improve the cutting accuracy of the laser cutting device and thus improve the product quality of a display panel.

The embodiments of the disclosure provide a laser cutting device, including: a conveying component including a feed end and a discharge end; a work table arranged at the discharge end of the conveying component; a first counter and a second counter, arranged opposite to each other on a side, proximate to the discharge end of the conveying component, of the work table and respectively driven by two opposite side edges of a conveyed substrate to rotate for counting; a laser cutter arranged above the work table; and a control apparatus, connected with the first counter, the second counter and the laser cutter and configured to determine a corrected cutting motion track of the laser cutter according to a set cutting track, and counting start and stop time points and counted values of the first counter and the second counter, and to control the laser cutter to cut the substrate according to the corrected cutting motion track.

The laser cutting device according to the embodiments of the disclosure includes the first counter and the second counter which are arranged opposite to each other on the side, proximate to the discharge end of the conveying component, of the work table. When the conveying component conveys the substrate to the work table, the first counter and the second counter are driven by the two opposite side edges of the conveyed substrate to rotate for counting, and the control apparatus determines the corrected cutting motion track of the laser cutter according to the set cutting track, and the counting start and stop time points and the counted values of the first counter and the second counter. Compared with the prior art, the laser cutting device has the advantages that the laser cutter is controlled to cut the substrate according to the corrected cutting motion track, thus the cutting accuracy of the laser cutting device is improved, and then the product quality of the display panel is improved.

Optionally, the first counter includes an absolute value rotary coding counter or an incremental rotary coding counter, and the second counter includes an absolute value rotary coding counter or an incremental rotary coding counter.

Optionally, each of the first counter and the second counter includes a rotating shaft abutting against a side edge of the substrate, and an outer wall of the rotating shaft is sleeved with a protective sleeve. By adopting this structural design, the phenomenon of chippings produced by rigid contact between the side edges of the substrate and the rotating shafts may be reduced, and thus wear of the substrate is reduced.

Optionally, the rotating shaft is provided with at least one protrusion, and for each of the at least one protrusion, an inner wall of a corresponding protective sleeve is provided with a groove matched with the protrusion. By adopting this structural design, the slipping phenomenon between the protective sleeves and the rotating shafts may be reduced.

Optionally, the protective sleeve includes a rubber protective sleeve or a silicone protective sleeve.

Optionally at least two groups of oppositely arranged first counters and second counters are provided. A plurality of corrected cutting motion tracks may be obtained according to the counting start and stop time points and the counted values of the at least two groups of first counters and second counters, and a relatively accurate corrected cutting motion track may be determined by averaging the plurality of corrected cutting motion tracks, so that the cutting accuracy of the laser cutting device is more accurate.

Optionally, the conveying component includes a plurality of first conveying belts arranged in parallel.

Optionally, the conveying component further includes a roller arranged on a side of the discharge end, and the roller is able to move and extend to the work table and be retracted to a position below the plurality of first conveying belts. By adopting this structural design, the friction between the substrate and the tabletop of the work table may be reduced, so that the wear of the substrate is reduced.

The embodiments of the disclosure further provide a control method applicable to the laser cutting device above according to the embodiments of the disclosure, where the control method includes: controlling the conveying component to convey a substrate to the work table; receiving counting start and stop time points and counted values of the first counter and the second counter; and determining a corrected cutting motion track of the laser cutter according to a set cutting track, and the counting start and stop time points and the counted values of the first counter and the second counter, and controlling the laser cutter to cut the substrate according to the corrected cutting motion track.

According to the control method of the laser cutting device according to the embodiments of the disclosure, the corrected cutting motion track of the laser cutter is determined according to the counting start and stop time points and the counted values of the first counter and the second counter. Compared with the prior art, the method has the advantages that the laser cutter is controlled to cut the substrate along the corrected cutting motion track, so that the cutting accuracy of the laser cutting device is improved, and then the product quality of a display panel is improved.

The embodiments of the disclosure further provide a control apparatus applicable to the laser cutting device above according to the embodiments of the disclosure, where the control apparatus includes: a conveying control element, configured to control the conveying component to convey a substrate to the work table; a receiving element, configured to receive counting start and stop time points and counted values of the first counter and the second counter; and a cutting control element, configured to determine a corrected cutting motion track of the laser cutter according to a set cutting track, and the counting start and stop time points and the counted values of the first counter and the second counter, and to control the laser cutter to cut the substrate according to the corrected cutting motion track.

According to the control apparatus of the laser cutting device according to the embodiments of the disclosure, the cutting control element determines the corrected cutting motion track of the laser cutter according to the set cutting track, and the counting start and stop time points and the counted values, which are received by the receiving element, of the first counter and the second counter, and controls the laser cutter to cut the substrate according to the corrected cutting motion track. Compared with the prior art, the control apparatus has the advantages that the laser cutter is controlled to cut the substrate along the corrected cutting motion track, so that the cutting accuracy of the laser cutting device is improved, and thus the product quality of a display panel is improved.

DETAILED DESCRIPTION OF THE EMBODIMENTS

To improve the cutting accuracy of a laser cutting device and thus improve the product quality of a display panel, the disclosure provides a laser cutting device, and a control method and a control apparatus thereof. To make the objects, technical solutions and advantages of the disclosure more apparent, the disclosure will be described below in further details with reference to the drawings.

Figure 1:
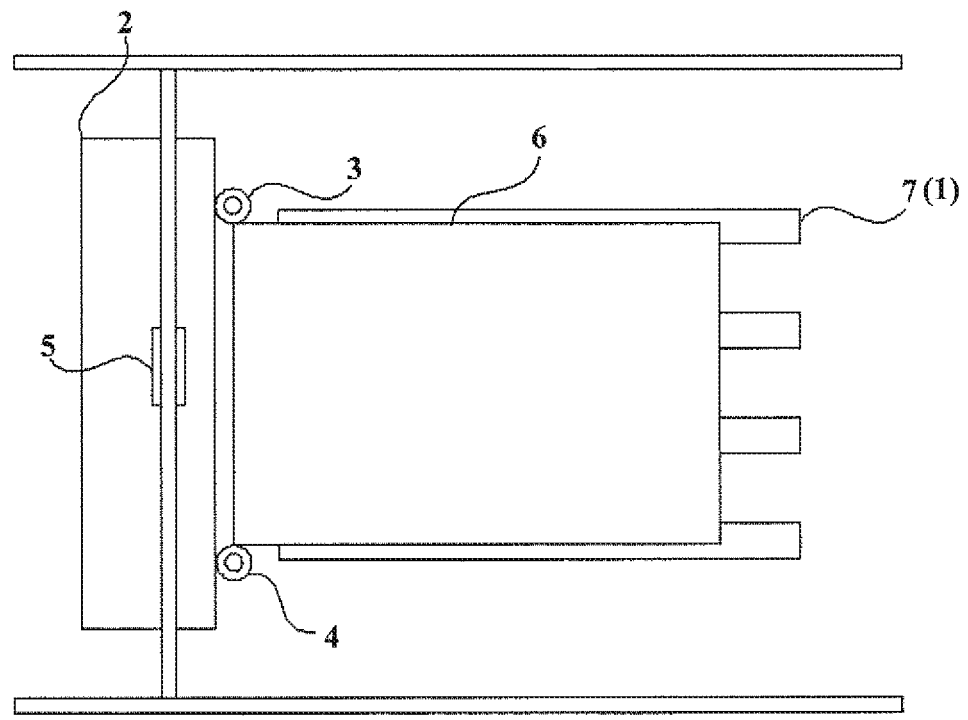
FIG. 1 is a schematic diagram of a laser cutting device according to the embodiments of the disclosure.

As illustrated in FIG. 1, the embodiments of the disclosure provide a laser cutting device, where the laser cutting device includes following components.

A conveying component 1, including a feed end and a discharge end.

A work table 2, arranged at the discharge end of the conveying component 1.

A first counter 3 and a second counter 4, arranged opposite to each other on a side, proximate to the discharge end of the conveying component 1, of the work table 2, and respectively driven by two opposite side edges of a conveyed substrate 6 to rotate for counting.

A laser cutter 5, arranged above the work table 2.

And a control apparatus, connected with the first counter 3, the second counter 4 and the laser cutter 5, and configured to determine a corrected cutting motion track of the laser cutter 5 according to a set cutting track, and counting start and stop time points and counted values of the first counter 3 and the second counter 4, and to control the laser cutter 5 to cut the substrate 6 according to the corrected cutting motion track.

The laser cutting device according to the embodiments of the disclosure includes the first counter 3 and the second counter 4 which are arranged opposite to each other on the side, proximate to the discharge end of the conveying component 1, of the work table 2. When the conveying component 1 conveys the substrate 6 to the work table 2, the first counter 3 and the second counter 4 are driven by the two opposite side edges of the conveyed substrate 6 to rotate for counting, and the control apparatus determines the corrected cutting motion track of the laser cutter 5 according to the set cutting track, and the counting start and stop time points and the counted values of the first counter 3 and the second counter 4. Compared with the prior art, the laser cutting device has the advantages that the laser cutter 5 is controlled to cut the substrate 6 according to the corrected cutting motion track, thus the cutting accuracy of the laser cutting device is improved, and accordingly the product quality of the display panel is improved.

In the embodiments of the disclosure, the type of the first counter 3 is not limited. For example, the first counter may be an absolute value rotary coding counter or an incremental rotary coding counter, and alike, the second counter 4 includes an absolute value rotary coding counter or an incremental rotary coding counter.

Figure 2:
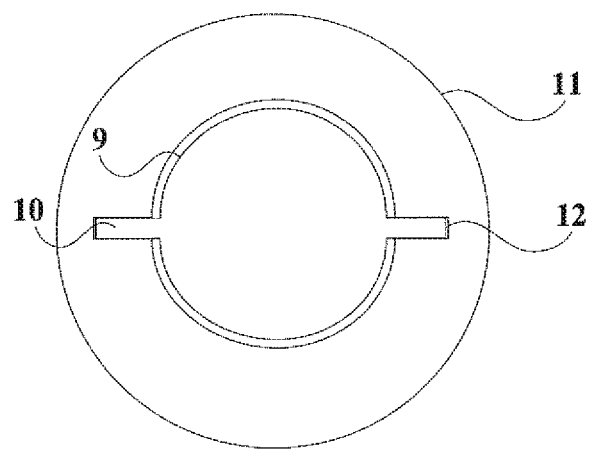
FIG. 2 is a schematic diagram of a rotating shaft according to the embodiments of the disclosure.

As illustrated in FIG. 2, optionally, each of the first counter 3 and the second counter 4 includes a rotating shaft 9 abutting against a side edge of the substrate 6, and an outer wall of each rotating shaft 9 is sleeved with a protective sleeve 11. By adopting this structural design, the phenomenon of chippings produced by rigid contact between the side edges of the substrate 6 and the rotating shafts 9 may be reduced, and thus wear of the substrate 6 is reduced.

Continuously referring to FIG. 2, optionally, each rotating shaft 9 is provided with at least one protrusion 10, and for each protrusion 10, an inner wall of a corresponding protective sleeve 11 is provided with a groove 12 matched with the protrusion 10. By adopting this structural design, the slipping phenomenon between the protective sleeves 11 and the rotating shafts 9 may be reduced.

In the embodiments of the disclosure, the type of the protective sleeves 11 is not limited. For example, the protective sleeves 11 may be rubber protective sleeves 11 or silicone protective sleeves 11.

Optionally, at least two groups of oppositely arranged first counters 3 and second counters 4 are provided. Accordingly, a plurality of corrected cutting motion tracks may be obtained according to the counting start and stop time points and the counted values of the at least two groups of first counters 3 and second counters 4, and a relatively accurate corrected cutting motion track of the laser cutter 5 may be determined by averaging the plurality of corrected cutting motion tracks, so that the cutting accuracy of the laser cutting device is more accurate.

In the embodiments of the disclosure, the type of the conveying component 1 is not limited. For example, in some embodiment of the disclosure, the conveying component 1 includes one first conveying belt 7; and in another embodiment of the disclosure, the conveying component 1 includes a plurality of first conveying belts 7 arranged in parallel, as illustrated in FIG. 1.

Figure 3:
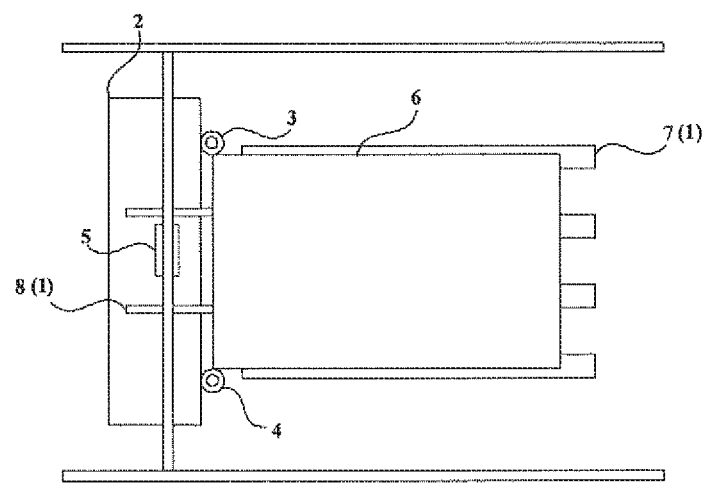
FIG. 3 is another schematic diagram of the laser cutting device according to the embodiments of the disclosure.

As illustrated in FIG. 3, optionally, the conveying component 1 further includes a roller 8 arranged on a side of the discharge end, and the roller 8 is able to move and extend to the work table 2 and be retracted to a position below the first conveying belts 7. By adopting this structural design, the friction between the substrate 6 and the tabletop of the work table 2 may be reduced, so that the wear of the substrate 6 is reduced.

Figure 4:
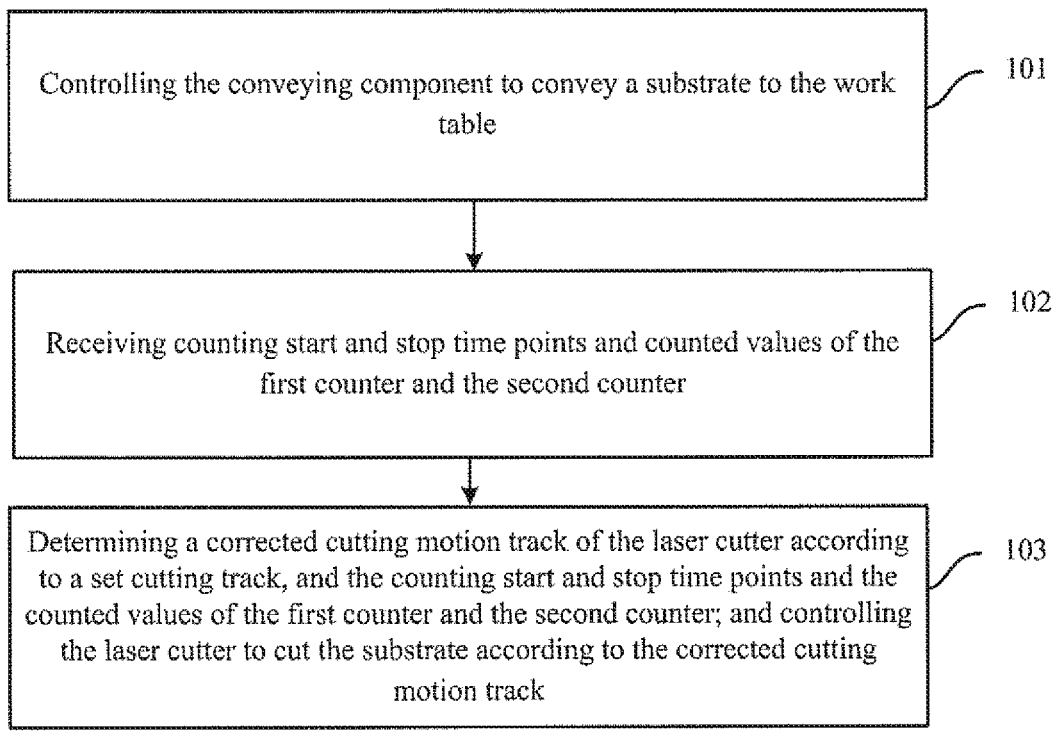
FIG. 4 is a schematic flow chart of a control method of the laser cutting device according to the embodiments of the disclosure.

As illustrated in FIG. 4, the embodiments of the disclosure further provide a control method applicable to the laser cutting device above according to the embodiments of the disclosure, where the control method includes following operations.

Operation 101, controlling the conveying component to convey a substrate to the work table.

Operation 102, receiving counting start and stop time points and counted values of the first counter and the second counter.

Operation 103, determining a corrected cutting motion track of the laser cutter according to a set cutting track, and the counting start and stop time points and the counted values of the first counter and the second counter; and controlling the laser cutter to cut the substrate according to the corrected cutting motion track.

According to the control method of the laser cutting device according to the embodiments of the disclosure, the corrected cutting motion track of the laser cutter 5 is determined according to the counting start and stop time points and the counted values of the first counter 3 and the second counter 4. Compared with the prior art, the method has the advantages that the laser cutter 5 is controlled to cut the substrate 6 along the corrected cutting motion track, so that the cutting accuracy of the laser cutting device is improved, and thus the product quality of a display panel is improved.

In the embodiments of the disclosure, optionally, before performing the operation 101, the control method further includes: controlling a driving apparatus to drive a roller to extend to the work table. And after the operation 102 is finished and before the operation 103 is performed, the control method further includes: controlling the driving apparatus to drive the roller to be retracted from the work table. By adopting this structural design, the friction between the substrate 6 and the tabletop of the work table may be reduced, so that the wear of the substrate 6 is reduced.

Figure 5:
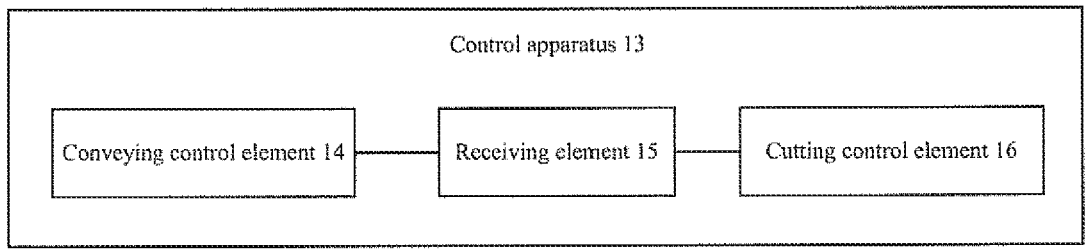
FIG. 5 is a schematic diagram of a control apparatus of the laser cutting device according to the embodiments of the disclosure.

As illustrated in FIG. 5, the embodiments of the disclosure further provide a control apparatus 13 applicable to the laser cutting device above according to the embodiments of the disclosure, where the control apparatus includes following elements.

A conveying control element 14, configured to control the conveying component 1 to convey the substrate 6 to the work table 2.

A receiving element 15, configured to receive counting start and stop time points and counted values of the first counter 3 and the second counter 4.

A cutting control element 16, configured to determine a corrected cutting motion track of the laser cutter 5 according to a set cutting track, and the counting start and stop time points and the counted values of the first counter 3 and the second counter 4, and to control the laser cutter 5 to cut the substrate 6 according to the corrected cutting motion track.

According to the control apparatus 13 of the laser cutting device according to the embodiments of the disclosure, the cutting control element 16 determines the corrected cutting motion track of the laser cutter 5 according to the set cutting track, and the counting start and stop time points and the counted values, which are received by the receiving element 15, of the first counter 3 and the second counter 4, and controls the laser cutter 5 to cut the substrate 6 according to the corrected cutting motion track. Compared with the prior art, the control apparatus 13 has the advantages that the laser cutter 5 is controlled to cut the substrate 6 along the corrected cutting motion track, so that the cutting accuracy of the laser cutting device is imporved, and thus the product quality of a display panel is improved.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A laser cutting device, comprising:
   a conveying component, comprising a feed end and a discharge end;
   a work table, arranged at the discharge end of the conveying component;
   a first counter and a second counter, arranged opposite to each other on a side, proximate to the discharge end of the conveying component, of the work table, and respectively driven by two opposite side edges of a conveyed substrate to rotate for counting;
   a laser cutter, arranged above the work table; and
   a control apparatus, connected with the first counter, the second counter and the laser cutter and configured to determine a corrected cutting motion track of the laser cutter according to a set cutting track, and counting start and stop time points and counted values of the first counter and the second counter, and to control the laser cutter to cut the substrate according to the corrected cutting motion track;

wherein the first counter comprises an absolute value rotary coding counter or an incremental rotary coding counter, and the second counter comprises an absolute value rotary coding counter or an incremental rotary coding counter; and each of the first counter and the second counter comprises a rotating shaft abutting against a side edge of the substrate, and an outer wall of the rotating shaft is sleeved with a protective sleeve.

2. The laser cutting device according to claim 1, wherein the rotating shaft is provided with at least one protrusion; and for each of the at least one protrusion, an inner wall of a corresponding protective sleeve is provided with a groove matched with said protrusion.

3. The laser cutting device according to claim 1, wherein the protective sleeve comprises a rubber protective sleeve or a silicone protective sleeve.

4. The laser cutting device according to claim 1, wherein at least two groups of oppositely arranged first counters and second counters are provided.

5. The laser cutting device according to claim 1, wherein the conveying component comprises a plurality of first conveying belts arranged in parallel.

6. The laser cutting device according to claim 5, wherein the conveying component further comprises a roller arranged on a side of the discharge end, and the roller is able to move and extend to the work table and be retracted to a position below the plurality of first conveying belts.

7. A control apparatus applicable to the laser cutting device according to claim 1, comprising:

a conveying control element, configured to control the conveying component to convey a substrate to the work table;

a receiving element, configured to receive counting start and stop time points and counted values of the first counter and the second counter; and a cutting control element, configured to determine a corrected cutting motion track of the laser cutter according to a set cutting track, and the counting start and stop time points and the counted values of the first counter and the second counter, and to control the laser cutter to cut the substrate according to the corrected cutting motion track.

8. The control apparatus according to claim 7, wherein the receiving element is further configured to receive counting start and stop time points and counted values of at least two groups of oppositely arranged first counters and second counters.

9. The control apparatus according to claim 8, wherein the cutting control element is further configured to:

obtain a plurality of corrected cutting motion tracks according to the set cutting track, and the counting start and stop time points and the counted values of the at least two groups of oppositely arranged first counters and second counters; and determine the corrected cutting motion track of the laser cutter by averaging the plurality of corrected cutting motion tracks.

* * * * *